2 Sheets—Sheet 1

A. G. ROCKFELLOW.

Gate.

No. 8,515. Reissued Dec. 10, 1878.

WITNESSES:

C. Neveux

C. Sedgwick

INVENTOR:

A. G. Rockfellow

BY Munn & Co

ATTORNEYS.

N. PETERS, PHOTO-LITHOGRAPHER, WASHINGTON, D. C.

A. G. ROCKFELLOW.

Gate.

No. 8,515. Reissued Dec. 10, 1878.

WITNESSES:

C. Neveux

C. Sedgwick

INVENTOR:

A. G. Rockfellow

BY Munn & Co.

ATTORNEYS.

N. PETERS, PHOTO-LITHOGRAPHER, WASHINGTON, D. C.

UNITED STATES PATENT OFFICE.

ALBERT G. ROCKFELLOW, OF ASHLAND, OREGON.

IMPROVEMENT IN GATES.

Specification forming part of Letters Patent No. 201,703, dated March 26, 1878; Reissue No. 8,515, dated December 10, 1878; application filed October 11, 1878.

*To all whom it may concern:*

Be it known that I, ALBERT G. ROCKFELLOW, of Ashland, in the county of Jackson and State of Oregon, have invented a new and Improved Gate, of which the following is a specification:

My invention relates to an improved gate, which is intended to be used either as a house-yard gate or as a farm-gate, and which can be opened or closed by hand, or by cords or chains leading to and over pulleys at a distance from the gate. As a house-gate it is made to close automatically.

The object of my invention is to provide a gate with adjustable bearings, hangings, and fastenings—that is, with expanding and contracting hinges and latches—so arranged that the gate may be swung open in either direction. The gate closes automatically after the passage is made. The hinge is also adapted for secondary doors, to keep flies out, and for barn, stable, or other outhouse doors. It can be quickly and easily adjusted to the varying conditions of the gate in wet and dry weather, so as to preserve always its freedom of motion and operation. The hangings and fastenings are strong and substantial, and at the same time ornamental, so that the gate presents a handsome appearance and is conveniently operated.

Figure 1:
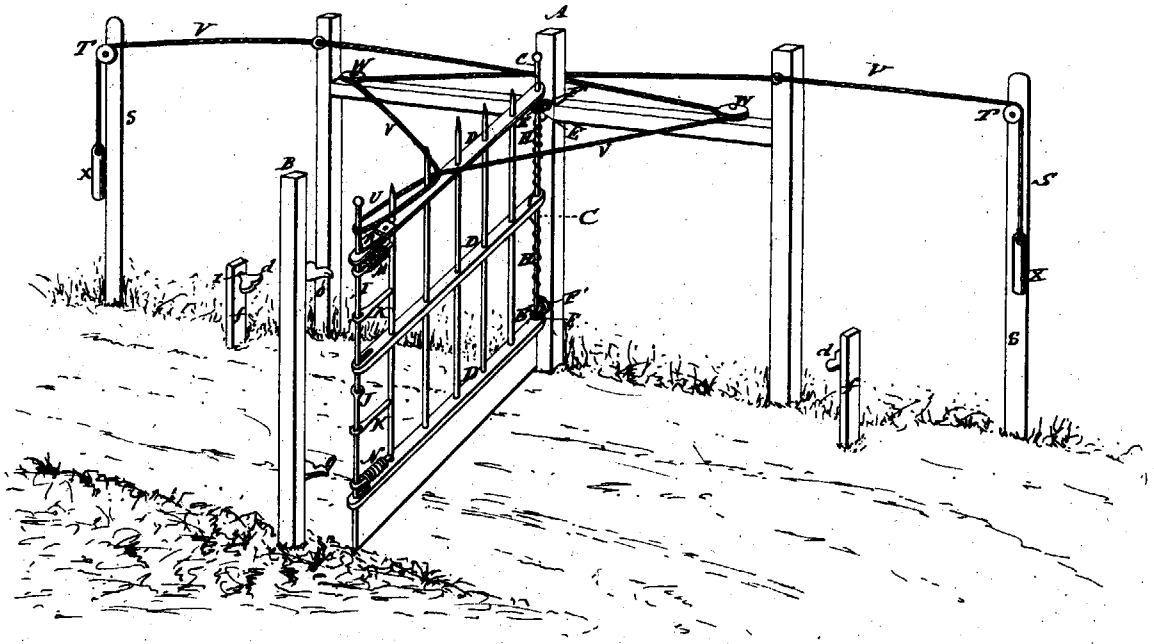
Figure 5:
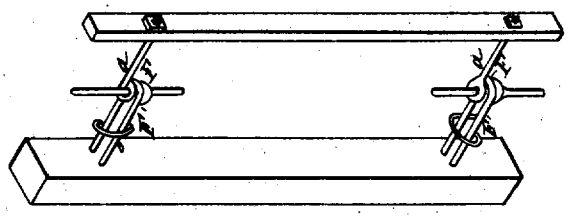
Figure 4:
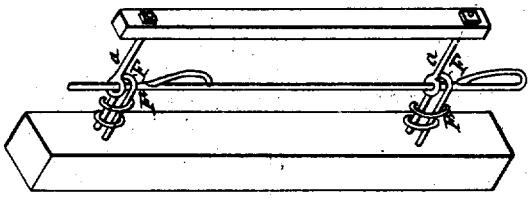
Figure 6:
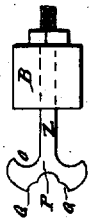
Figure 2:
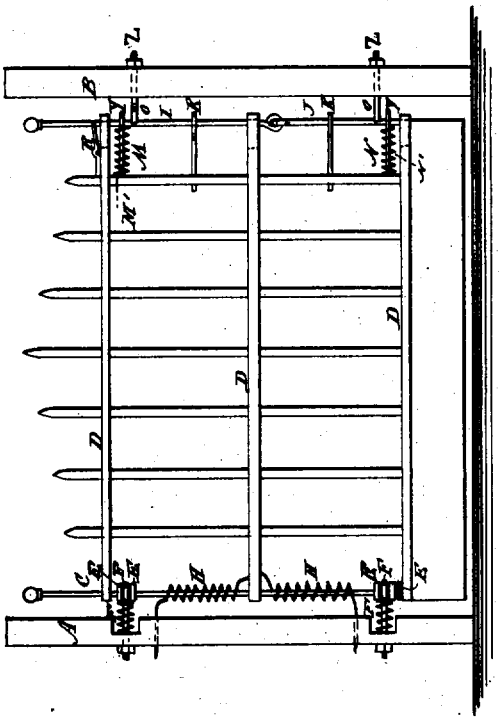
Figure 3:
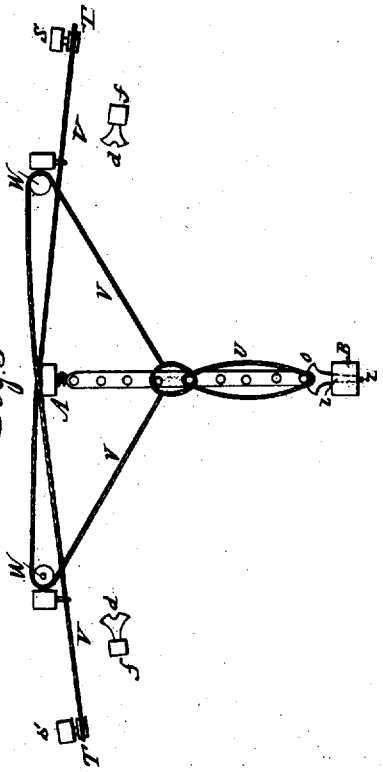

Referring to the accompanying drawings, Figure 1 represents a perspective view of my improved gate; Fig. 2, a side view; Fig. 3, a plan view of the same. Figs. 4 and 5 are modified forms of hanging the gate; and Fig. 6 is a detail top view of the catch for locking the latch-rods.

Similar letters of reference indicate corresponding parts.

A in the drawings represents the post to which the gate is hung, and B the post against which it closes.

The gate is hung to the post A by means of a hinge mechanism, which is constructed as follows: An axis-rod or pintle, C, made of pipe or solid iron, is secured vertically at the rear end of the gate, so as to extend from the bottom to the top, passing through the horizontal pieces D D of the gate, as shown in Figs. 1 and 2.

The pintle C has collars E, either fixed or adjustable, for placing the joint of the hinge at any desired point on the pintle. The object of the adjustable collars is to raise the gate over a temporary impediment—as, for instance, snow in winter—and lower it again. These collars or stops may be made in any suitable manner, provided that they may be rigidly attached to the pintle and readily adjusted thereon.

The pintle C swings in long narrow staples F, whose legs are of different lengths and are just far enough apart to receive the pintle C. The staples form slots for the pintle to slide and turn in. The pintle is passed through the slot, so that the collars E rest upon the staples F.

A spirally-coiled metallic spring, F′, (the hinge-spring,) is passed round or slipped over the legs of the staple back of the pintle. The staple is then driven into holes made in the post A to receive it, and secured at the back of the post by a nut on the long leg, or in other suitable manner.

When the staple is driven sufficiently in the post the springs F′ will be compressed between the post and collars placed on the staples, so as to press the pintle close to the ends of the slotted staples. These springs, in connection with the slotted staples, give to the joint of the hinge the property of elasticity, and impart to the hinge the quality that admits of expansion and contraction.

The axis or pintle has a nut on its upper end. This pintle may be stationary in the pieces D and turn freely on the staples, or it may be attached to the staples and turn in the pieces D. The hinge so formed is adjustable—that is, expanding and contracting in horizontal direction. The pintle may, therefore, be moved closer to or farther from the post A by turning the nuts of the staples F, which either contracts the spring or admits it to expand, so as to compensate thereby for the swelling and shrinking of the gate and fence occasioned by the weather, and keep, thereby, the gate working freely and easily all the time.

To close the gate, two springs, H H, are used, which may be termed "shutter-springs." These springs are coiled in opposite directions around the pintle, one around the upper part, the other around the lower part of the same.

The extreme or diverging ends of the springs are secured to the post A, while the approaching or converging ends are secured to the gate, near its center, either to the middle piece D or to the next adjoining picket, or otherwise. This peculiar arrangement of the springs makes them right and left handed springs, and causes them to act with equal force from either side to close the gate when opened in either direction.

The opposite coiling of the springs, so as to be right and left handed springs, is secured by inverting or reversing one spring with reference to the other, so as to admit of being connected to the gate at nearly the same point, and diverge in right and left hand coils to the point of connection with the post, any other combination making them both right or both left handed springs, and unable to act in both directions for closing the gate.

The gate-latch consists of two jointed rods, I J, which are arranged as follows: These rods pass vertically through slots in the forward ends of the horizontal pieces D, and also through link-shaped screw-eyes M N, above the lower and below the upper piece D. The rods I J pass also through fixed screw-eyes K K, about midway between the lower and middle and the middle and upper pieces D, the rods being jointed or hinged to each other immediately below the middle pieces D, the upper end projecting several inches above the upper beam.

Spiral springs M′ N′ (the latch-springs) are slipped over the shanks of the screw-eyes M N, between the latch-rods and the posts or pickets, into which the screw-eyes are screwed. These springs press the rods outwardly in the slots, and keep them in their proper perpendicular position and in line with each other. Upon applying pressure, however, to the projecting upper end of the latch-rod, so as to force it back in the slot of the upper piece D, toward the middle of the gate, the jointed rods swing on the screw-eyes K as fulcra, and act as levers, so as to force their jointed ends outward or forward, and the upper and lower ends inward or backward, producing thus the unlatching or disengaging of the latch-rods from the catches O O of the gate-post B.

The catches O O are screwed into the gate-post B, one opposite each screw-eye M N, and the jointed rods thrown into engagement therewith when the gate is closed.

Each catch O consists of a head attached to a screw-bolt, Z. The head stands transversely to the rods, and its edge is curved on each side, so that the latch-rods sliding over the curves will be gradually thrown back until they drop into the notch P in its middle. This notch is made with an offset or secondary notch, Q, at each side of the center notch, so that if the closing force should carry the latch-rod beyond the main notch, P, it will be caught by the secondary notch, Q, and thrown back into the main notch. This latch-holder or catch O can be adjusted closer to or farther from the latch-rods by turning the screw-shank so as to accommodate it to the latch-rod, whose position is varying with the state of the weather.

The adjustment is effected by grasping the head of the catch with the hand or a wrench, and turning it into or out of the gate-post. The catches form two perfect fastenings for the gate, one with the upper and the other with the lower latch-rod.

In connection with the latch a folding hinge-shaped lock, R, is screwed to the top of the upper piece D, between the latch-rod and picket, which lock folds toward the picket and opens out toward the latch, so as to lock the gate when it is desirable to do so.

The gate, which is hung and latched as described, forms an excellent house-yard gate, to be operated by hand. By grasping the upper end of the latch-rod I and the first picket between the thumb and the fingers, and pressing the rod toward the picket, the latch-rods will be released from the catches, and the gate can be opened in either direction. The shutter-springs will return it to its closed position.

In Figs. 4 and 5 are shown modified constructions of the pintle for hanging the gate.

To convert the gate into a farm-gate, to be opened or closed from a wagon or on horseback, a post, S, is erected at each side of the gate, and at a suitable distance therefrom. At the upper end of each post S is mounted a pulley, T, over which a cord, V, is passed, which is attached at its middle portion to a loop-shaped cord, U, which is passed around the upper latch-rod, I, and around one or more pickets of the gate. The end portions of cord V are carried from the loop U over pulleys W, supported on intermediate posts at both sides of the gate, thence in opposite directions, so as to cross each other through suitable guide staples or pulleys, near the pulleys W, to the pulleys T, as shown in Figs. 1 and 3.

To the ends of the cord V are attached weights X, which assist the operating of the gate, so that by drawing on the rope V, on either side of the gate, the latch-rods will be released from the catches, and the gate opened in opposite directions.

A catch-plate, *d*, of the same construction as catch O, is also attached to a short post, *f*, at each side of the gate, and at such a distance therefrom that it will engage the lower latch-rod when the gate is open, and thus hold the gate until the opposite rope is drawn to release and close the same.

This arrangement is quite simple and effective, as it enables a person on horseback or in a carriage to open the gate in front, and close it after passing through, without getting off the horse or wagon.

Having thus described my invention, I claim as new and desire to secure by Letters Patent—

1. The combination of the pintle C, having collars E, with supporting adjustable staples F of the gate-post, and with compensatingsprings F′ of the staples, substantially as and for the purpose set forth.

2. The combination of the pintle C, having collars E, with the oppositely-coiled shutter-springs H, whose ends are respectively affixed to the gate and gate-post, substantially as specified.

3. The latch-rods I J, jointed at or near the mid-height of the gate and fulcrumed to screw-eyes K, in combination with the slotted pieces D of the gate, the guiding-screw eyes M M, and their springs M′ N, substantially as set forth.

4. The combination of the jointed, guided, and spring-acted latch-rods I and J with the adjustable catches O of the gate-post, substantially as and for the purpose set forth.

5. The combination of the jointed latch-rods with a hinge-shaped clasp or lock of the upper piece of the gate, and with the catches of the gate-post, to lock the latch-rods and gate, substantially as described.

6. An adjustable catch for the latch-rods, consisting of a threaded bolt or shank and double curved head, substantially as set forth.

7. The catch-head O, provided with the central notch, P, and secondary notches or offsets, Q, substantially as specified.

8. The combination, with the jointed latch-rods I J, of an endless cord or loop, U, and of a draw-rope, V, which is arranged to pass over pulleys W and pulleys T of posts S, substantially as set forth.

9. The combination of the swinging and spring-cushioned gate, having jointed and spring-acted latch-rods, with the operating-cords U and V, and with the retaining-catches *d* at each side of the gate, substantially as and for the purpose set forth.

ALBERT G. ROCKFELLOW.

Witnesses:
E. J. FARLOW,
O. R. MYER.